United States Patent [19]
Jorgensen et al.

[11] 4,075,327
[45] Feb. 21, 1978

[54] METHOD FOR THE TREATMENT OF TREES SUBJECT TO DUTCH ELM DISEASE

[75] Inventors: Erik Jorgensen, Ottawa; Dibyendu N. Roy, Willowdale; Edward S. Kondo, Sault Ste. Marie, all of Canada

[73] Assignee: Canadian Patents and Development Limited, Ottawa, Canada

[21] Appl. No.: 470,950

[22] Filed: May 17, 1974

Related U.S. Application Data

[62] Division of Ser. No. 347,902, April 4, 1973, abandoned.

[30] Foreign Application Priority Data

May 7, 1972 Canada .................................. 142406

[51] Int. Cl.$^2$ ............................................. A01N 9/22
[52] U.S. Cl. ......................... 424/273 R; 424/DIG. 8; 424/200; 548/306
[58] Field of Search ....................................... 424/273

[56] References Cited

FOREIGN PATENT DOCUMENTS 1,195,180   6/1970   United Kingdom .............. 260/309.2

OTHER PUBLICATIONS

Smalley, "Phytopathology", vol. 61, (1971), pp. 1351–1353.

Primary Examiner—V. D. Turner
Attorney, Agent, or Firm—James R. Hughes

[57] ABSTRACT

A systemic fungicide and method of application to trees subject to the Dutch elm disease fungus and other fungus diseases wherein the fungicide material used is a water-soluble derivative of methyl-2-benzimidazole carbamate (BCM) and the method of introduction is a positive pressure root injection method. Examples of the water-soluble derivatives are chloride, sulphate, phosphate, nitrate, and sodio derivatives of BCM. The injection method is achieved by severing one or more roots below ground level and applying the fungicide solution to the severed root end under pressure via suitable tubulation.

5 Claims, 2 Drawing Figures

METHOD FOR THE TREATMENT OF TREES SUBJECT TO DUTCH ELM DISEASE

This application is a divisional of Ser. No. 347,902 filed Apr. 4, 1973 now abandoned.

This invention relates to a method for the treatment of trees against fungus diseases especially the Dutch elm disease fungus.

Dutch elm disease (*Ceratocystis ulmi*) seems to have originated in Asia where native elms were resistant to the fungus but made its first impact in Europe affecting trees in Holland and northern France in 1919. The first incidence of the disease in North America was in Ohio in 1930 and in Canada, in Ontario in 1946. Since that time, the disease has spread in epidemic proportions until virtually every elm tree is threatened.

Much research into the Dutch elm disease has been undertaken but unfortunately much of it has been started too late to save millions of North America's greatest shade tree. Many studies have dealt only with aspects of the disease such as the control of the bark beetles which spread the causal fungus.

Although a number of commercial systemic fungicides are available which will arrest the development of Dutch elm disease and other fungus diseases of trees in vitro, it has been very difficult to introduce them into the tree and to achieve even distribution of the active elements throughout the tree. One of these commercially available fungicides, methyl 1-(butylcarbomoyl)-2-benzimidazole carbamate also known as Benomyl and Benlate (Trade-mark) and disclosed in U.S. Pat. No. 3,010,968 issued Nov. 21, 1961 has been reported to be effective against Dutch elm disease when applied as large quantities to the soil in the tree's root areas. Other approaches have involved boring holes into the tree trunk and introducing purported systemic fungicides into the tree's vascular system or by bark and trunk application using the "wet bandage" technique. The systemic fungicides that have been produced to date and applied by the methods outlined above generally have not provided satisfactory levels of control or cure of the Dutch elm disease. These failures appear to have resulted from difficulties encountered in obtaining even distribution of introduced materials throughout the tree and in introducing sufficient quantities of the materials into the tree's vascular system. While some success has been achieved with the fungicides mentioned above against the Dutch elm disease when applied in large quantities to the soil in the tree's root area, extremely large quantities — calculated up to 800 lbs. per acre — are required to achieve even marginal results. Concern for adverse environmental effects with such massive dosages, variability of results as influenced by soil type, and the costs of the large amounts of chemicals required have mitigated against wide-scale use of this method.

Introduction of systemic fungicides through holes bored in the trunks of infected trees has been largely unsuccessful because the materials have not been distributed evenly throughout the tree following introduction and the wounds left by the borings have served as infection courts for other fungi and bacteria. Foliar application and the "wet bandage" technique against vascular diseases such as the Dutch elm disease have failed because of introduction and distribution problems encountered with avoidable fungicides and undesirable side effects such as foliar burn have occurred. In addition the spraying of the leaves in an open environment with chemicals possibly toxic to humans and animals is highly undesirable.

It is an object of the present invention to provide a fungicide and a method of application to the trees that is not environmently deleterious either to the soil around the tree, the atmosphere surrounding the tree, or the surface (leaves, bark, etc.) of the tree itself.

It is another object of the invention to provide a fungicide and method of application that is effective in the control and cure of fungus induced diseases such as the Dutch elm disease.

It is another object of the invention to provide a fungicide and method of treatment of the trees that is generally easy of application and non-injurious to the health and safety of those applying the treatment and also to any humans or animals that might come in the vicinity of the trees under treatment.

It is another object of the invention to provide a method of treatment of trees suffering from fungus diseases such as the Dutch elm disease that is non-wasteful and efficient in the amounts of fungicide chemical being applied.

It is another object of the invention to provide a method of application of systemic fungicides to trees that introduces these readily into the living tree in such a manner that they can be transported effectively through the vascular system to all parts of the tree.

These and other objects of the invention are achieved by a systemic fungicide and method of application to trees subject to the Dutch elm disease fungus and other fungus diseases wherein the fungicide material used is a water-soluble derivative of methyl-2-benzimidazole carbamate (BCM) and the method of introduction is a positive pressure root injection method. Examples of the water-soluble derivatives are the chloride, sulphate, phosphate, nitrate, and sodio derivatives of BCM. The injection method is achieved by severing one or more roots below ground level and applying the fungicide solution to the severed root end under pressure via suitable tubulation.

In drawings which illustrate an embodiment of the invention,

Figure 1:
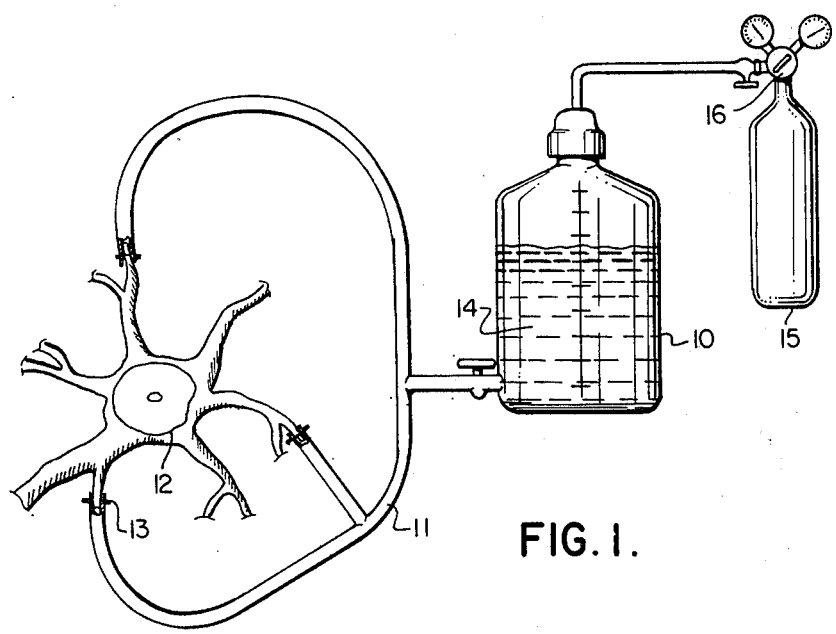
FIG. 1 is a schematic diagram of the fungicide application system.

In Dutch elm disease, a systemic wilt, the pathogen *Ceratocystic ulmi* (Buison) C. Moreau is found in the host's vascular system therefore the fungicide chemicals must be introduced into the vascular system without damaging the tree extensively. Referring to FIG. 1 a method of doing this is shown. A reservoir 10 (preferably a graduated plastic aspirator bottle) is connected via tubing 11 (e.g. ¾ inch tygon) to one or more severed roots of the tree 12. The trees are carefully excavated outward from the trunk until suitable root sizes (¾ inch diameter) are found. Elm roots fork commonly and are close to the soil surface so that appropriate roots can be easily selected. Care must be exercised during te excavation because the introduced solution could leak from any injuries to the roots. The selected roots are washed and severed and the tubing slipped on and secured by suitable clamps 13. The fungicide solution is gravity-fed into the tubing system carefully to avoid the formation of air bubbles. The time interval between severing the root and applying the liquid should be kept to a minimum. Finally the reservoir 10 is filled with the solution 14 and pressure is applied from a suitable pressure source 15, e.g. nitrogen gas cylinder and adjusted by means of pressure regulator 16. The pressure required is not high and it has been found experimentally that increasing the pressure above a certain level did not increase the rate of uptake of the solution significantly. It has also been found experimentally that the solution will penetrate the entire sapwood evenly as well as the whole root system and all the leaves within 48 hours of its application. This includes the area surrounding the brown streaks in the sapwood which are characteristic of the DED and severely wilted leaves. For smaller trees (six to eight inches in diameter) introducing the solution via two roots is probably adequate. For larger trees application to more roots will probably be required. The pressure of application must be positive and it seems that this pressure causes activation or irritation of the severed root end such that uptake and passage of the solution into the root is effected. The pressure range has been found to lay in the range 5 psi to 25 psi. The normal pressure of domestic water systems is in this range and this may be a useful facility when treating shade trees convenient to houses or buildings having a pressure system of this kind.

The method of introducing aqueous chemicals described has several advantages. The solution is distributed throughout the vascular system of the tree. Large volumes are introduced allowing a lower concentration of chemicals used thereby reducing the chemical toxicity level at the area of introduction. Introducing chemicals directly into roots circumvents the problems of spraying or drenching excess amounts of chemicals. The wounds created by severing a few small (¾ inch diameter) roots in a mature tree will heal rapidly. There is apparently a direct relationship between rate of uptake of the solution through the severed roots and facts such as temperature, wind, humidity, light and time of day which normally affect the transpiration rate but these are second order effects and do not negate or seriously concern the overall method. The solution intake can be monitored to accommodate for these effects.

Referring to the fungicide materials themselves, the following table gives examples of these:

BCM (METHYL-2-BENZIMIDAZOLE CARBAMATE) DERIVATIVES

| NAME | STRUCTURE |
|---|---|
| Methyl-2-benzimidazolecarbamate sulphate | 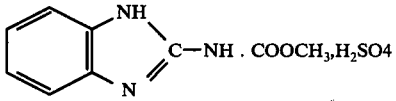 |
| Dimer of Methyl-2-benzimidazolecarbamate sulphate | 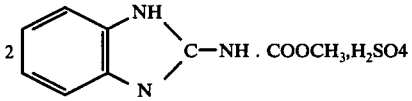 |
| Methyl-2-benzimidazolecarbamate phosphate | 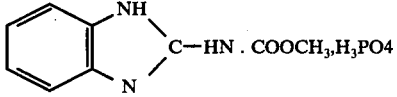 |
| Dimer of Methyl-2-benzimidazolecarbamate phosphate | 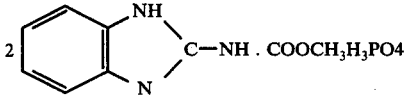 |
| Methyl-2-benzimidazolecarbamate nitrate | 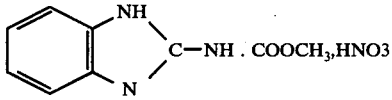 |

-continued

BCM (METHYL-2-BENZIMIDAZOLE CARBAMATE) DERIVATIVES

| NAME | STRUCTURE |
|---|---|
| Methyl-2-benzimidazolecarbamate hydrochloride | 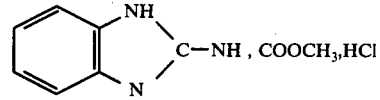 |
| Sodio derivative of Methyl-2-benzimidazole carbamate | 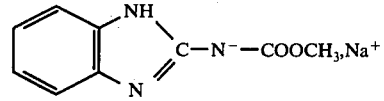 |

These are all salts of BCM which itself is a known and previously synthesized material. In fact BCM has been previously found from the commercially available fungicide Benlate (Trade-mark). See paper entitled "Formation of a fungitoxic derivative from Benlate" by G. P. Clemens and H. D. Sisler, Phytopathology 59, 705–706, (1969). See also paper entitled, "Methyl-2-benzimidazole-carbamate, a fungitoxic compound isolated from cotton plants" by J. J. Simms, H. Mee, and D. C. Erwin, Phytopathology 59, 1775–1776, (1969).

Figure 2:
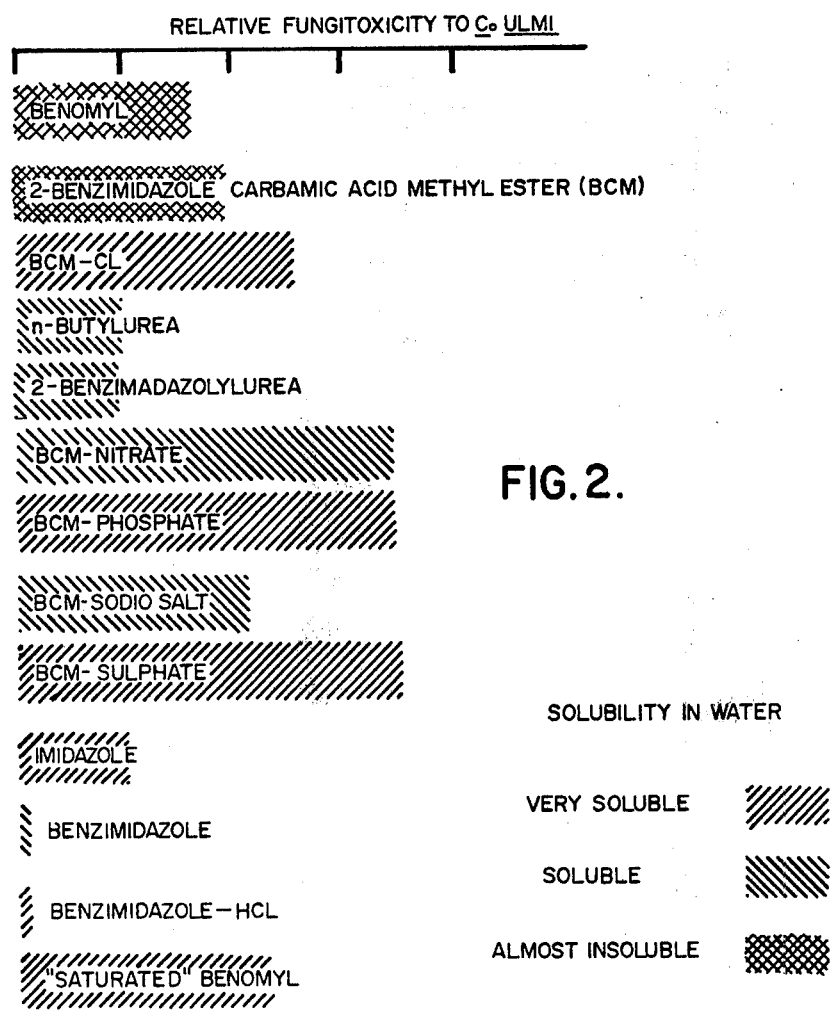
FIG. 2 is a table of relative fungo-toxicity levels of various materials and their solubility in water.

It has been found that Benomyl or Benlate and also BCM itself are almost insoluble in water but the salts of BCM are soluble or very soluble and still have a very high relative fungitoxicity to C. ulmi. FIG. 2 gives a comparative table of various materials showing solubility and toxicity levels as determined by laboratory bioassays. It will be seen from this that BCM chloride, BCM nitrate, BCM phosphate, BCM sulphate, and a sodio derivative of BCM have the necessary solubility and the high fungitoxicity to be used with the application method described above to obtain good results against the Dutch elm disease and similar fungus diseases of trees.

The following is an example of a general procedure to convert BCM to its salts: a weighed amount of BCM (Methyl-2-benzimidazole-carbamate) is suspended in methanol or in a mixture of methanol and water. Sufficient solvent is used to facilitate subsequent filtration. The suspension is heated with stirring until refluxing begins. The desired acid (phosphoric acid, sulphuric acid, hydrochloric acid, nitric acid) is then added dropwise until all the suspended solid dissolves. The colour of the solution turns to brown or deep brown and the pH of the solution becomes 3 to 4. The hot solution is filtered under suction and the filtrate is allowed to cool until the crystallisation of the salt is complete (yield: 70% to 90%). The light brown or grey crystals are collected by filtration, washed with cold water and finally with acetone. The salts may be recrystallised from hot water and the colour of the product may be improved by using decolourising charcoal. The above procedure is illustrated by the following example: BCM (1 g) is suspended in a mixture of methanol (25 ml) and water (25 ml). The slurry is heated on a hot plate using a magnetic stirrer. To the boiling solution o-phosphoric acid (1.5 ml) is added dropwise whereby all the solid goes into solution. The resulting brown solution is stirred and heated for additional 5 minutes followed by filtration using suction. The filtrate on cooling gave BCM-phosphate (0.9 g) as light grey crystals. The product was treated with decolourising charcoal in hot water to give off white crystals of the desired phosphate.

The following is an example of a general procedure to convert BCM to its sodio derivative: a weighed amount of BCM is suspended in methanol and heated with stirring till the refluxing begins. Sodium hydroxide solution (1 N) is added dropwise to form a clear brown solution (pH: 9-10). The solution is filtered using suction and the filtrate on cooling gave crystals of the sodio derivative of BCM. The salt may be recrystallised from boiling hot water.

It is expected that the phosphate may be the most attractive fungicide material in that it has nutrient or fertilizer value as well. The fungicide would be used in the form of a solution in water in the range 50 ppm. to 2000 ppm. Solutions of this strength should present little or no hazard to humans, domestic animals, or to wildlife. It is not clear as yet although it probably is the case that an innoculation treatment would last over a season into the next year. This would imply that it would be possible to protect trees by innoculation schedules including up-dating (booster) treatments.

The action of the treatment described above is not completely clear as yet but it is known that it does not kill the fungus but inhibits or stops reproduction of what is known as "bud spores" which can be transported in the circulatory system of the tree. The infected area is in effect isolated and localized and spreading of the disease does not occur.

We claim:

1. A method of systemic fungicide treatment of trees subject to Dutch elm disease comprising severing one or more roots of the tree below ground level and applying an aqueous solution of a water-soluble derivative of methyl-benzimidazole carbamate fungicide material, said solution having a concentration of 50 to 2000 parts of fungicide material per million parts of the aqueous solution, to the severed end of the root under a positive pressure in the range 5 psi. and 25 psi. and for a treatment time between one hour and 48 hours, wherein the fungicide material is methyl-2-benzimidazole carbamate chloride.

2. A method of systemic fungicide treatment of trees subject to Dutch elm disease comprising severing one or more roots of the tree below ground level and applying an aqueous solution of a water-soluble derivative of methyl-benzimidazole carbamate fungicide material, said solution having a concentration of 50 to 2000 parts of fungicide material per million parts of the aqueous solution to the severed end of the root under a positive pressure in the range 5 psi. and 25 psi. and for a treatment time between one hour and 48 hours, wherein the fungicide material is methyl-2-benzimidazole carbamate sulphate.

3. A method of systemic fungicide treatment of trees subject to Dutch elm disease comprising severing one or more roots of the tree below ground level and applying an aqueous solution of a water-soluble derivative of methyl-benzimidazole carbamate fungicide material, said solution having a concentration of 50 to 2000 parts of fungicide material per million parts of the aqueous solution, to the severed end of the root under a positive pressure in the range 5 psi. and 25 psi. and for a treatment time between one hour and 48 hours, wherein the fungicide material is methyl-2-benzimidazole carbamate phosphate.

4. A method of systemic fungicide treatment of trees subject to Dutch elm disease comprising severing one or more roots of the tree below ground level and applying an aqueous solution of a water-soluble derivative of methyl-benzimidazole carbamate fungicide material, said solution having a concentration of 50 to 2000 parts of fungicide material per million parts of the aqueous solution, to the severed end of the root under a positive pressure in the range 5 psi. and 25 psi. and for a treatment time between one hour and 48 hours, wherein the fungicide material is methyl-2-benzimidazole carbamate nitrate.

5. A method of systemic fungicide treatment of trees subject to Dutch elm disease comprising severing one or more roots of the tree below ground level and applying an aqueous solution of a water-soluble derivative of methyl-benzimidazole carbamate fungicide material, said solution having a concentration of 50 to 2000 parts of fungicide material per million parts of the aqueous solution, to the severed end of the root under a positive pressure in the range 5 psi. and 25 psi. and for a treatment time between one hour and 48 hours, wherein the fungicide material is sodio derivative of methyl-2-benzimidazole carbamate.

* * * * *